(12) United States Patent
Bauer et al.

(10) Patent No.: US 9,083,201 B2
(45) Date of Patent: Jul. 14, 2015

(54) LOAD SHEDDING CIRCUIT FOR RAM AIR TURBINES

(75) Inventors: Ronald P. Bauer, Windsor Locks, CT (US); Clifford G. Stevens, Rockton, IL (US); William Betterini, Rocky Hill, CT (US); Joshua N. Schroeder, Windsor Locks, CT (US); Robert W. Webster, East Longmeadow, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 870 days.

(21) Appl. No.: 13/232,199

(22) Filed: Sep. 14, 2011

(65) Prior Publication Data

US 2013/0062943 A1    Mar. 14, 2013

(51) Int. Cl.
*H02J 9/08* (2006.01)
*H02J 9/06* (2006.01)

(52) U.S. Cl.
CPC .. *H02J 9/08* (2013.01); *H02J 9/066* (2013.01)

(58) Field of Classification Search
CPC .................................... H02J 9/066; H02J 9/08
USPC ................ 307/64, 68, 141, 9.1, 10.1, 65, 66; 244/58, 59
See application file for complete search history.

(56) References Cited

U.S. PATENT DOCUMENTS

| | | | | |
|---|---|---|---|---|
| 3,379,893 A * | 4/1968 | Cavanaugh | ...................... | 307/41 |
| 5,899,411 A * | 5/1999 | Latos et al. | .................. | 244/53 A |
| 5,903,065 A * | 5/1999 | Dragos | ............................. | 307/64 |
| 5,939,800 A * | 8/1999 | Artinian et al. | .................. | 307/64 |
| 6,018,233 A * | 1/2000 | Glennon | .......................... | 322/22 |
| 6,127,758 A * | 10/2000 | Murry et al. | .................... | 310/168 |
| 6,142,418 A * | 11/2000 | Weber et al. | ..................... | 244/58 |
| 6,344,700 B1 * | 2/2002 | Eisenhauer et al. | ............ | 307/64 |
| 8,657,227 B1 * | 2/2014 | Bayliss et al. | ................... | 244/58 |
| 2004/0169422 A1 * | 9/2004 | Eaton et al. | ...................... | 307/64 |
| 2004/0172204 A1 * | 9/2004 | Eaton et al. | ..................... | 702/57 |
| 2006/0061213 A1 * | 3/2006 | Michalko | ........................ | 307/9.1 |
| 2007/0108963 A1 * | 5/2007 | Wavering et al. | ........... | 324/158.1 |
| 2009/0121546 A1 * | 5/2009 | Langlois et al. | ................ | 307/23 |
| 2009/0228223 A1 * | 9/2009 | Liu et al. | ......................... | 702/59 |
| 2009/0302917 A1 * | 12/2009 | Okamoto | ....................... | 327/231 |
| 2010/0170983 A1 * | 7/2010 | Fervel et al. | .................. | 244/99.2 |
| 2010/0177453 A1 * | 7/2010 | Critchley et al. | ............. | 361/140 |
| 2010/0270858 A1 * | 10/2010 | Foch et al. | ...................... | 307/9.1 |
| 2011/0184579 A1 * | 7/2011 | Nilsen et al. | ................... | 700/295 |
| 2011/0198918 A1 * | 8/2011 | Langlois et al. | ................ | 307/9.1 |
| 2012/0105097 A1 * | 5/2012 | Hancock et al. | .......... | 324/764.01 |
| 2012/0318914 A1 * | 12/2012 | Rajashekara et al. | ........... | 244/58 |

* cited by examiner

*Primary Examiner* — Jared Fureman
*Assistant Examiner* — Carlos Laguerre
(74) *Attorney, Agent, or Firm* — Kinney & Lange, P.A.

(57) ABSTRACT

A power generation/distribution system includes a RAM air turbine (RAT) generator and an emergency integrated control center (EICC) that selectively applies either primary power provided by a primary power source or emergency power developed by the RAT generator to an alternating current essential bus (AC ESS bus) for distribution to one or more essential loads. The EICC monitors the primary power and in response to a loss of primary power selectively disables the supply of power from the AC ESS bus to the essential loads and manages subsequent loading of the RAT generator by the essential loads.

22 Claims, 2 Drawing Sheets

LOAD SHEDDING CIRCUIT FOR RAM AIR TURBINES

BACKGROUND

The present invention is related to RAM air turbines (RATs) and in particular to load shedding circuits employed with RATs.

RAM Air Turbines (RATs) are emergency power generation systems included in a variety of aircraft. A RAT includes a turbine that can be selectively placed into the airstream of a moving aircraft to utilize mechanical energy necessary to drive the generator. Electric energy developed by the RAT generator is distributed to one or more electric loads. Load-shedding refers to the disabling of loads connected to the RAT generator during initial deployment of the RAT.

SUMMARY

A power generation/distribution system includes a RAM Air Turbine (RAT) generator and an Emergency Integrated Control Center (EICC) that selectively applies either primary power provided by a primary power source or emergency power developed by the RAT generator to an Alternating Current Essential bus (AC ESS bus) for distribution to one or more essential loads. The EICC monitors the primary power and in response to a loss of primary power selectively disables the supply of power from the AC ESS bus to the essential loads and manages subsequent loading of the essential loads on the RAT generator.

DETAILED DESCRIPTION

Figure 1:
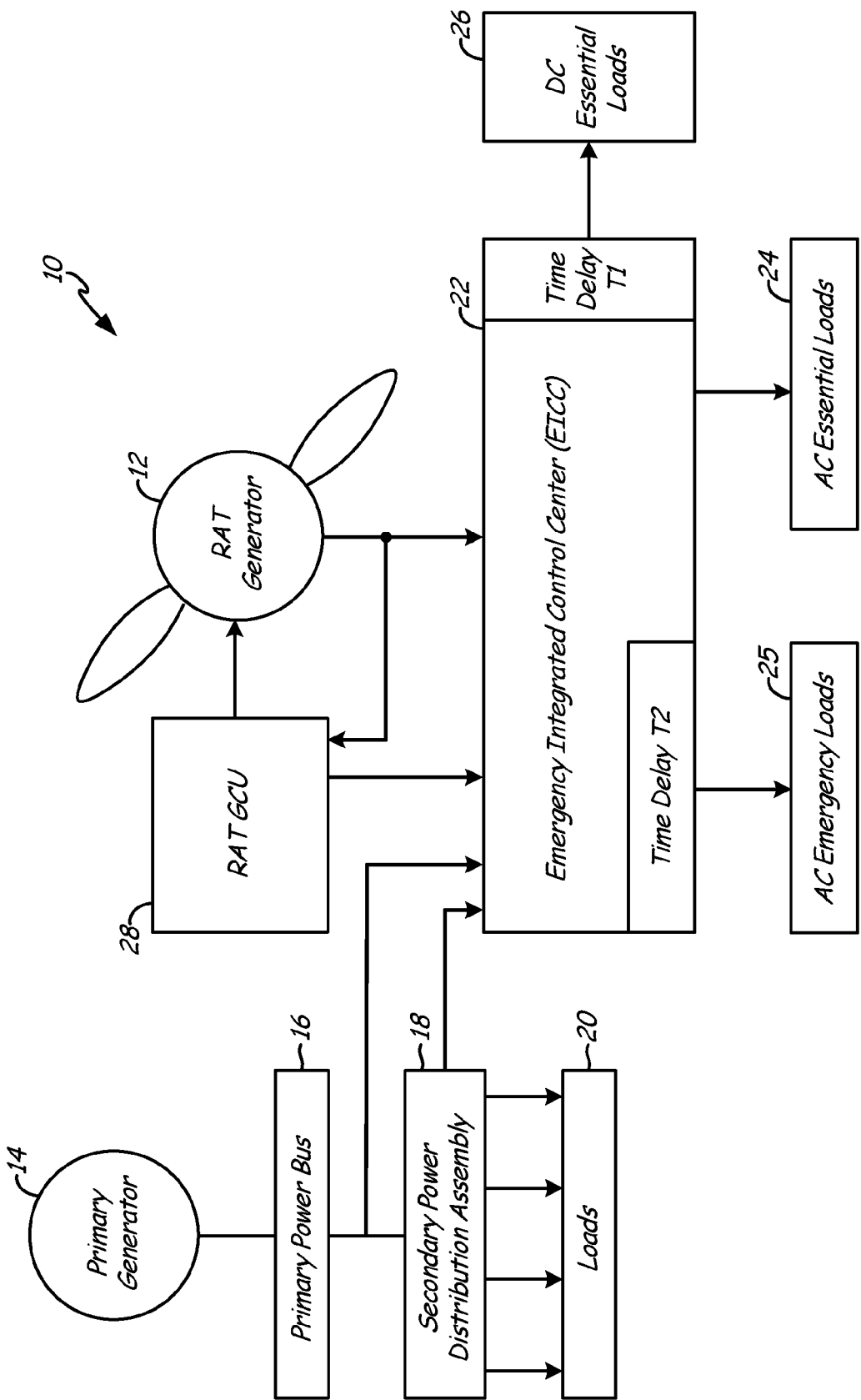
FIG. 1 is a single line diagram of a power generation/distribution system according to an embodiment of the present invention.

FIG. 1 is a single line diagram of power generation/distribution system 10 according to an embodiment of the present invention.

In the embodiment shown in FIG. 1, power generation/distribution system 10 includes RAT generator 12, primary generator 14, primary power bus 16, secondary power distribution assembly (SPDA) 18, non-essential/non-emergency loads 20, emergency integrated control center (EICC) 22, alternating current (AC) essential loads 24, AC emergency loads 25, direct current (DC) essential loads 26, and RAT generator control unit (GCU) 28. Primary generator 14 generates electrical power for distribution to various loads around the aircraft provided via primary power bus 16 and secondary power distribution assembly 18. In other embodiments, additional primary generators are included as part of power generation/distribution system 10.

Emergency Integrated Control Center (EICC) 22 supplies power to AC essential loads 24, AC emergency loads 25, and DC essential loads 26. For example, in one embodiment AC emergency loads 25 includes fan units employed to cool electronics on-board the aircraft. In other embodiments, AC emergency loads 25 include other high priority loads that receive emergency power when primary power is unavailable. Similarly, AC essential loads 24 may include AC loads such as fan units or other high priority loads that receive emergency power when primary power is unavailable and DC essential loads 26 may include high priority DC loads that receive emergency power when primary power is unavailable. The terms "essential" and "emergency" do not represent the relative importance of the various loads. Rather, these terms represent that loads can be separated into different groups that can be selectively activated separately from one another during emergency operations. In some embodiments, AC emergency loads 25 are only activated during an emergency loss of power (i.e., resulting in deployment of RAT generator 12), but in other embodiments may include loads that are activated during both normal operations and emergency operations.

During normal operation, power supplied by EICC 22 to AC essential loads 24, AC emergency loads 25, and DC essential loads 26 is derived from primary generator 14, referred to herein as "primary power". RAT generator 12 remains stowed or un-deployed during normal operation, such that RAT generator 12 does not generate any electrical power for delivery by EICC 22. In the event primary generator 14 fails, such that primary power is not available for distribution to EICC 22, then RAT generator 12 is deployed into the airstream. When first deployed into the airstream, RAT generator 12 rotates slowly. Significant torque loads created by in-rush currents associated with attached loads is detrimental to the start-up of RAT generator 12 (i.e., may cause RAT generator 12 to stall if the torque created by the in-rush currents is greater than the torque provided by the airstream).

To prevent detrimental start-up of RAT generator 12, EICC 22 automatically disables (i.e., sheds) one or more loads and then staggers the supply of power from RAT generator 12 to AC essential loads 24, AC emergency loads 25, and DC essential loads 26 to ensure proper starting of RAT generator 12. In the embodiment shown in FIGS. 1 and 2, power supplied by RAT generator 12 to EICC 22 is first supplied to AC essential loads 24, and then subsequently supplied to DC essential loads 26 after time delay T1 and to AC emergency loads 25 after time delay T2. By staggering the supply of power to AC essential loads 24, AC emergency loads 25, and DC essential loads 26, EICC 22 prevents detrimental start-up of RAT generator 12.

In particular, EICC 22 includes anticipation logic (shown in FIG. 2) that monitors primary power provided to EICC 22 to anticipate losses of power that will result in deployment of RAT generator 12, and in response, disables (sheds) the provision of power from EICC 22 to AC essential loads 24, AC emergency loads 25, and DC essential loads 26 until RAT generator 12 has been deployed and reaches an adequate threshold level (e.g., threshold voltage, threshold spin speed, etc.) determined by RAT GCU 28. EICC 22 further manages loading of RAT generator 12 by providing a time delay between application of power to AC essential loads 24, AC emergency loads 25, and DC essential loads 26 to ensure RAT generator 12 is capable of handling in-rush currents associated with turning On the various loads.

Figure 2:
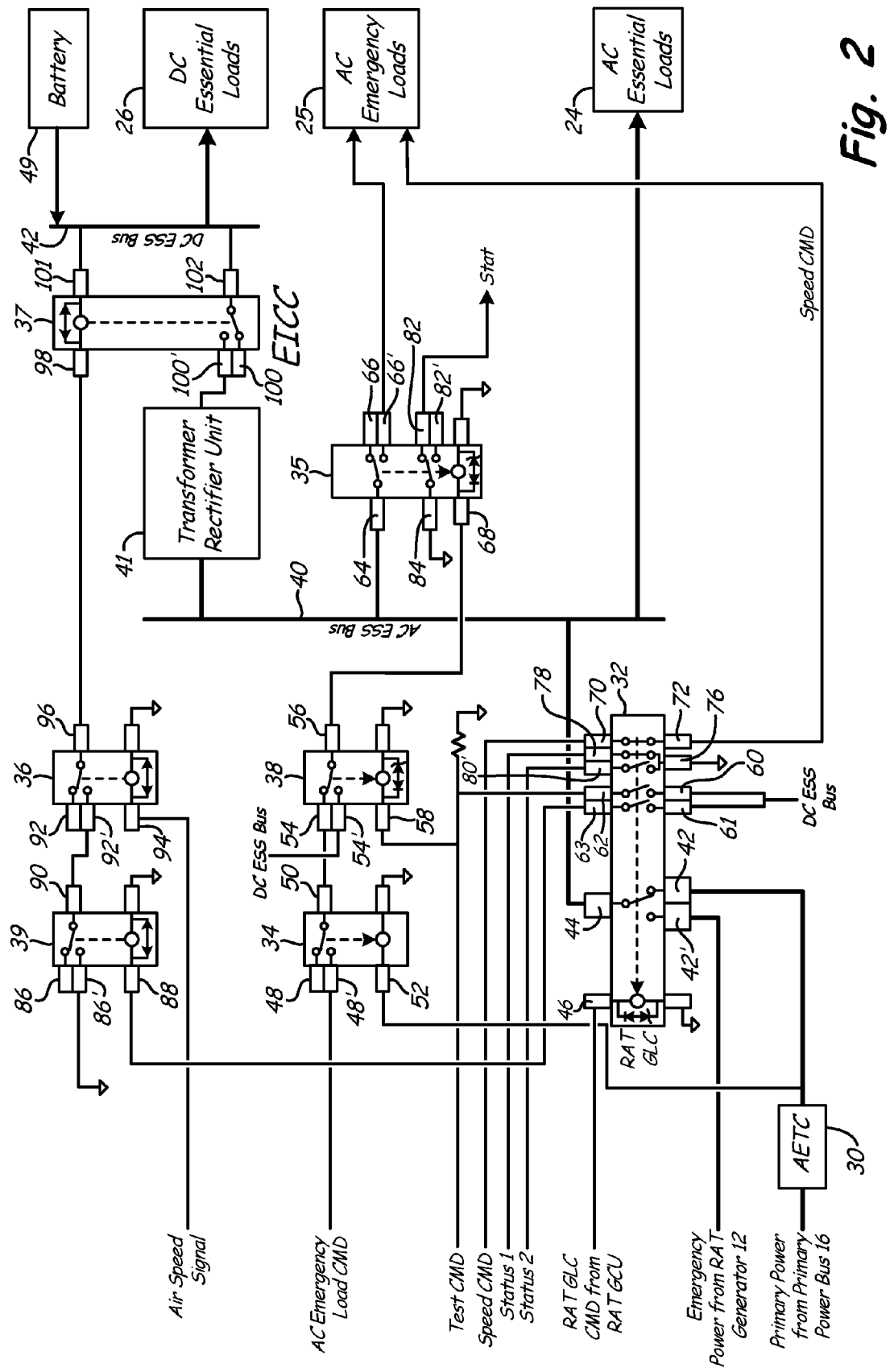
FIG. 2 is a diagram of a circuit within an emergency integrated control center (EICC) that provides autonomous load shedding.

FIG. 2 is a diagram of a circuit within Emergency Integrated Control Center (EICC) 22 that provides autonomous load shedding according to an embodiment of the present invention. EICC 22 receives primary power from primary power bus 16 during normal operation or from RAT generator 12 during emergency operation, and controls the distribution of power to AC essential loads 24, AC emergency loads 25, and DC essential loads 26. In the embodiment illustrated in FIG. 2, AC essential loads 24 and AC emergency loads 25 may include multi-speed fans, although in other embodiments various other loads may be employed.

In the embodiment shown in FIG. 2, EICC 22 includes AC essential tie contactor (AETC) 30, RAT generator line contactor (GLC) 32, first relay circuit 34, second relay circuit 35, third relay circuit 36, fourth relay circuit 37, first time delay relay circuit 38, second time delay relay circuit 39, alternating current essential bus (AC ESS bus) 40, transformer rectifier unit (TRU) 41, direct current essential bus (DC ESS bus) 42. In the embodiment shown in FIG. 2, transformer rectifier unit (TRU) 41 is illustrated as being included as part of EICC 22, but in other embodiments may be external to EICC 22. For each set of relay circuits, including RAT GLC 32, first relay circuit 34, second relay circuit 35, third relay circuit 36, fourth relay circuit 37, first time delay relay circuit 38, and second time delay relay circuit 39, at least some of the output terminals are selectively connected to one of two input terminals depending on the state (energized or de-energized) of the relay circuit. Those input terminals connected to an output terminal during the de-energized state of the relay circuit are denoted without the use of a prime suffix. Those input terminals connected to an output terminal during the energized state of the relay circuit are denoted with a prime suffix (e.g., input terminal 48'). For some relay circuits, an input terminal is connected to one of two output terminals depending on the state of the relay, with the same notation being used for the output terminals.

Normal Operation

During normal operation, primary power is provided via AETC 30 to input terminal 42 of RAT GLC 32. For the sake of simplicity, AC power is illustrated by a single line, but may refer to single phase or multiple phase (e.g. three phase) AC power. During normal operation RAT GLC 32 remains un-energized and therefore supplies primary power received at input terminal 42 to output terminal 44 for distribution to AC ESS bus 40. Alternating current power distributed via AC ESS bus 40 is supplied directly to AC essential loads 24. Alternating current power distributed via AC ESS bus 40 is selectively applied to AC emergency loads 25 based on AC emergency load commands (CMD) communicated via first relay circuit 34, first time delay relay circuit 38 and second relay circuit 35.

In the embodiment shown in FIG. 2, the desired delay is provided by first time delay relay circuit 38 as described in more detail below. First relay circuit 34 includes input terminals 48 and 48', output terminal 50 and control terminal 52. When first relay circuit 34 is de-energized, input terminal 48 is an open input (i.e., is not connected to receive any input), while input terminal 48' is connected to receive AC emergency load command instructions from an external source such as SPDA 18 (shown in FIG. 1). Load command instructions provide one source of input regarding whether essential loads are turned On or Off. When first relay circuit 34 is energized, AC emergency command instructions are communicated from input terminal 48' to output terminal 50, and via first time delay relay circuit 38 to second relay circuit 35 to control power supplied from AC ESS bus 40 to AC emergency loads 25. When first relay circuit 34 is de-energized, AC emergency command instructions are not communicated to output terminal 50, and despite the state of the load command instructions, they do not influence the power distributed to AC emergency loads 25. By de-energizing first relay circuit 34, external sources (e.g., SPDA 18) are prevented from influencing the distribution of power to AC emergency loads 25. Alternating current power distributed in AC ESS bus 40 is also used to energize DC ESS bus 42. AC power received on AC ESS bus 40 is converted to DC power by TRU 41 that is supplied to DC ESS bus 42 via fourth relay circuit 37. In the embodiment shown in FIG. 2, DC ESS bus 42 also receives DC power from battery 49 during instances in which DC power is not supplied by TRU 41 and fourth relay circuit 37. Power provided onto DC ESS bus 42 is supplied to DC essential loads 26.

Anticipatory Load Shedding

Primary power supplied via an output of AETC 30 is monitored to detect a loss of primary power that will result in deployment of RAT generator 12. In response to the anticipated deployment of RAT generator 12, various loads such as AC emergency loads 25 are disconnected from AC ESS bus 40 (i.e., load shedding).

In the embodiment provided in FIG. 2, anticipation logic is implemented by monitoring primary power provided via an output of AETC 30, and providing a signal representative of the monitored primary power (e.g., voltage signal) to control terminal 52 of first relay circuit 34. During normal operation, when primary power is being supplied by AETC 30, the representative voltage provided at control terminal 52 energizes first relay circuit 34, connecting input terminal 48' to output terminal 50 and allowing AC emergency load commands to be communicated through the normally closed contacts of first time delay relay circuit 38 to second relay circuit 35, thereby dictating the supply of power to AC emergency loads 25. When primary power is lost, the representative voltage provided at control terminal 52 causes first relay circuit 34 to become de-energized, connecting open input terminal 48 to output terminal 50, thereby preventing AC emergency load commands from controlling the distribution of power to AC emergency loads 25.

As discussed in more detail below, connecting open input terminal 48 to output terminal 50 results in a logic low signal (i.e., Off signal) being communicated via first time delay relay circuit 38 to control terminal 68 of second relay circuit 35, thereby de-energizing second relay circuit 35 and preventing power distribution to AC emergency loads 25. In this way, AC emergency loads 25 are disconnected from AC ESS bus 40 in response to a loss of primary power, and in anticipation of the deployment of RAT generator 12.

RAT Generator Deployment

In response to a loss of primary power, RAT generator 12 is deployed into the airstream. After being deployed, RAT generator 12 begins to generate electrical power that increases with increasing speed of RAT generator 12. Emergency power provided by deployed RAT generator 12 is provided to RAT GLC 32 at input terminal 42'. Upon initial RAT deployment, RAT GLC 32 remains de-energized, and power provided by RAT generator 12 is not communicated by RAT GLC 32 to AC ESS bus 40 or any loads attached thereto. In response to the output of RAT generator 12 reaching an adequate threshold level (e.g., threshold voltage, threshold speed, etc.), RAT GCU 28 provides an activation signal to control terminal 46 of RAT GLC 32. In response, RAT GLC 32 is energized such that emergency power provided at input terminal 42' is provided via output terminal 44 to AC ESS bus 40.

In the embodiment shown in FIG. 2, AC essential loads 24 are connected directly to AC ESS bus 40, and therefore receive emergency power from RAT generator 12 immediately following energizing of RAT GLC 32. In contrast, AC emergency loads 25 are connected to AC ESS bus 40 via second relay circuit 35, and DC essential loads 26 are connected to AC ESS bus 40 via TRU 41 and fourth relay circuit 37, allowing power to be selectively applied to AC emergency loads 25 and DC essential loads 26 after AC ESS bus 40 has been energized (and therefore after power has been supplied to AC essential loads 24). In one embodiment, DC essential loads 26 are supplied with power from RAT generator 12 after a first delay period following activation of RAT GLC 32, and AC emergency loads 25 are supplied with power from RAT generator 12 after a second delay period, longer than the first delay period, following activation of RAT GLC 32.

Activation of AC Emergency Loads

To prevent overloading of RAT generator 12, AC emergency loads 25 are added as loads after other loads have been added, such as AC essential loads 24 and DC essential loads 26.

Even after RAT GLC 32 provides emergency power generated by RAT generator 12 to AC ESS bus 40, EICC 22 continues to manage loading of RAT generator 12. Upon initial deployment of RAT generator 12, the provision of emergency power to AC ESS bus 40 by RAT GLC 32 does not result in power being supplied to AC emergency loads 25. First relay circuit 34 remains de-energized, such that open circuit signal is provided at output terminal 50, and first time delay relay circuit 38 remains de-activated (and therefore, de-energized), such that the open-circuit signal provided by output terminal 50 of first relay circuit 34 is provided at output terminal 56 of first time delay relay circuit 38. Second relay circuit 35 therefore remains de-energized as well, preventing the distribution of power from AC ESS bus 40 to AC emergency loads 25.

First time delay relay circuit 38 remains de-activated until RAT GLC 32 is energized. When RAT GLC 32 is energized, an On signal (derived from the voltage supplied on DC ESS bus 42 by battery 49) is supplied via input terminal 60 of RAT GLC 32 to output terminal 62, which is connected to control terminal 58 of first time delay relay circuit 38. Once activated, first time delay relay 38 remains de-energized until expiration of a time delay (e.g., six seconds). At the expiration of the time delay, first time delay relay 38 is energized to connect input terminal 54' to output terminal 56. In the embodiment shown in FIG. 2, DC ESS bus 42 is connected to input terminal 54', providing default essential load command instructions (i.e., an On command) to second relay circuit 35. In one embodiment, first time delay relay circuit 38 is a time delay on engage relay, meaning that the time delay is implemented when delay relay circuit 38 is activated. A benefit of this design is the relay is only energized during emergency operations, and is not energized during normal operation (most of the time). This reduces power dissipation and corresponding heating of first time delay relay circuit 38.

The output supplied by first time delay relay circuit 38 is provided as an input to control terminal 68 of second relay circuit 35 to selectively energize/de-energize second relay circuit 35. When energized, second relay circuit 35 supplies AC power from AC ESS bus 40 (connected to input terminal 64) to AC emergency loads 25 (connected via output terminal 66'). When second relay circuit 35 is de-energized, power provided by AC ESS bus 40 is prevented from being provided to AC emergency loads 25.

In this way, EICC 22 anticipates the deployment of RAT generator 12 by monitoring for loss of primary power. In response to detected loss of primary power, AC emergency loads 25 are disconnected from AC ESS bus 40. In addition, loading of RAT generator 12 is controlled by selectively connecting AC emergency loads 25 to AC ESS bus 40 after other loads, such as AC essential loads 24, have been connected to RAT generator 12.

Activation of DC Essential Loads

DC essential loads 26 are connected to receive power from DC ESS bus 42. In the embodiment shown in FIG. 2, DC ESS bus 42 is supplied with power from AC ESS bus 40 via TRU 41 and from battery 49. A benefit of this architecture is that DC ESS bus 42 receives power from battery 49 even when no power is available on AC ESS bus 40. However, in other embodiments DC ESS bus 42 may be configured only to receive power from AC ESS bus 40 without the presence of battery 49. In this embodiment, other reliance on DC ESS bus 42 to provide a logic high valve (e.g. at input terminals 60, 61 of RAT GLC 32) would be provided with another source of DC power.

As discussed with respect to AC emergency loads 25, it is desirable to stagger the connection of DC ESS bus 42 and loads associated therewith to AC ESS bus 40 from the connection of other loads (e.g., AC essential loads 24 and AC emergency loads 25) during startup of RAT generator 12. For example, in one embodiment AC essential loads 24 receive power immediately after energizing RAT GLC 32, DC ESS bus 42 is connected as a load to AC ESS bus 40 approximately one second after power is supplied to AC ESS bus 40, and AC emergency loads 25 are connected as a load to AC ESS bus 40 approximately six seconds after power is supplied to AC ESS bus 40. In the embodiment shown in FIG. 2, second time delay relay circuit 39, third relay circuit 36, and fourth relay circuit 37 are used to selectively add DC essential loads 26 after the appropriate time delay.

When un-energized, fourth relay circuit 37 prevents DC power provided by TRU 41 from being supplied to DC ESS bus 42 by connecting open circuit input terminal 100 to output terminal 102 for supply to DC ESS bus 42. When energized, the DC input supplied by TRU 41 to input terminal 100' of fourth relay circuit 37 is supplied to DC ESS bus 42 via output terminal 102. Fourth relay circuit 37 is energized when second time delay relay circuit 39 and third relay circuit 36 are both energized, thereby creating a circuit path between DC ESS bus 42 (connected at output terminal 101), through third relay circuit 36 (via output terminal 96 and input terminal 92') and second time delay relay circuit 39 (via output terminal 90 and input terminal 86') to ground. Second time delay relay circuit 39 is activated when RAT GLC 32 is energized. When RAT GLC 32 is energized, DC ESS bus 42 (operating with power from battery 49) connected to input terminal 61 of RAT GLC 32 is communicated to output terminal 63, which in turn is connected to control terminal 88 of second time delay relay circuit 39. Once activated, second time delay relay circuit 39 does not become energized until the expiration of a defined time delay (e.g., one second). After the expiration of the desired time delay, second time delay relay circuit 39 is energized. As a result, input terminal 86' is connected to output terminal 90. In one embodiment, output terminal 90 may be connected directly to control terminal 98 of fourth relay circuit 37, without the presence of the intervening third relay circuit 36. In this embodiment, once second time delay relay circuit 39 is energized following expiration of the time delay then fourth relay circuit 37 is energized to supply power from TRU 41 to DC ESS bus 42.

In the embodiment shown in FIG. 2, third relay circuit 36 is energized in response to an air speed command signal provided to control terminal 94. The air speed command signal provides a logic high value or On signal that energizes third relay circuit 36 only when the airspeed of the aircraft is greater than a threshold value. A benefit of this approach, is at low air speeds when RAT generator 12 generates less power, DC ESS bus 42 will not draw additional power from AC ESS bus 40, but will instead rely on power supplied by battery 49. Once the airspeed of the aircraft reaches a threshold value, a logic high value or On signal is supplied to control terminal 94 of third relay circuit 36 thereby energizing the third relay circuit and creating a circuit path between input terminal 92' and output terminal 96.

In response to both second time delay relay circuit 39 and third relay circuit 36 being energized, fourth relay circuit 37 is energized, thereby connecting the DC output supplied by TRU 41 to input terminal 100' to output terminal 102 to provide DC power to DC ESS bus 42.

Speed Control and Test Features

In the embodiment shown in FIG. 2, EICC 22 includes additional features such as providing test command signals, status signals, and speed control signals to AC emergency loads 25. In the embodiment shown in FIG. 2, EICC 22 receives a speed command signal (Hi/Lo CMD) that determines the speed of AC emergency loads 25 (e.g., high fan speed, low fan speed). The speed command signal is provided to input terminal 70 of RAT GLC 32 and provided via output terminal 72 to AC emergency loads 25. During normal operation, when RAT GLC is de-energized the speed command signal is communicated via RAT GLC 32 to AC emergency loads 25. However, during emergency operation, when RAT GLC 32 is energized, then input terminal 70 is disconnected from output terminal 72 to enforce a default speed of AC emergency loads 25. For example, with respect to multi-speed fans, during emergency operation it is desirable to operate the fans at a low speed. By disconnecting input terminal 70 (i.e., speed command signal labeled 'HI/LO CMD') from output terminal 72, a low-speed default command is enforced. Depending on the application, the default speed of AC emergency loads 25 may be set to either high or low.

In the embodiment shown in FIG. 2, EICC 22 provides status signals status_1 and status_2 for indicating to other systems on the aircraft the status of EICC 22 (e.g., whether EICC 22 is in the normal operating mode or emergency operating mode). To accommodate status signals, RAT GLC 32 includes input terminal 76 connected to ground. Output terminals 78 and 80' are connected to input terminal 76. When RAT GLC 32 is de-energized, output terminal 78 is connected to ground through input terminal 76 to generate status signal 1, while output terminal 80' is disconnected from input terminal 76 to generate status signal 2. When RAT GLC 32 is energized, then output terminal 80' is connected to ground via input terminal 76 while output terminal 78 is disconnected from input terminal 76. These status signals provide feedback regarding whether RAT GLC 32 is energized or de-energized, and therefore whether EICC 22 is operating in normal or emergency mode.

In the embodiment shown in FIG. 2, EICC 22 also includes the ability to test or verify the time delay associated with activation of AC emergency loads 25 following a transition from primary power to emergency power. A test command signal (labeled 'TEST CMD') is provided as an input to EICC 22. The test signal is provided to control terminal 58 of first time delay relay circuit 38. Typically, first time delay relay circuit 38 is energized when RAT GLC 32 is energized (operating in emergency mode). The test command signal replicates the input provided by RAT GLC 32 by applying an activation signal to control terminal 58. The response of first time delay relay circuit 38 is monitored via status signal (labeled 'Stat') provided at output terminal 82 of second relay circuit 35. When de-energized, output terminal 82 is connected to ground via input terminal 84. When energized output terminal 82 is disconnected from ground. If the monitored status signal is detected at the appropriate time following provision of the test command signal to first time delay relay circuit 38, then operation of first time delay relay circuit 38 is verified.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A power generation/distribution system comprising:
    a primary power source configured to generate primary electrical power;
    a RAM air turbine (RAT) generator configured to generate emergency electrical power when deployed into an airstream;
    an emergency integrated control center (EICC) configured to transition a plurality of electrical loads from the primary electrical power to the emergency electrical power, the plurality of electrical loads including one or more essential loads and one or more emergency loads, each load connected directly or indirectly to an alternating current essential bus (AC ESS bus), the EICC selectively applying either primary electrical power or emergency electrical power to the AC ESS bus for selective distribution to the one or more essential loads and the one or more emergency loads;
    wherein the EICC is configured to monitor the primary electrical power and in response to a detected loss of primary electrical power selectively disables a supply of primary electrical power to the one or more essential loads and the one or more emergency loads, and the EICC is configured to manage subsequent loading of the RAT generator by the one or more essential loads and the one or more emergency loads; and
    wherein the EICC comprises:
        a RAM air turbine generator line contactor (RAT GLC) that provides primary power to the AC ESS bus when de-energized and emergency power to the AC ESS bus when energized, and
        a first time delay relay circuit activated by energizing of the RAT GLC, wherein activating the first time delay relay circuit energizes the first time delay relay circuit after a first time delay;
        wherein energizing of the first time delay circuit allows distribution of emergency electrical power from the AC ESS bus to a subset of the one or more essential loads which are connected indirectly to the AC ESS bus.

2. The power generation/distribution system of claim 1, wherein the one or more essential loads includes at least one alternating current (AC) essential load connected directly to the AC ESS bus such that the at least one AC essential load receives emergency electrical power immediately following energizing of the RAT GLC.

3. The power generation/distribution apparatus of claim 1, wherein the subset of the one or more essential loads not connected directly to the AC ESS bus includes at least one direct current (DC) essential load.

4. The power generation/distribution system of claim 1, wherein de-energizing at least one of a first relay circuit and a second relay circuit prevents load commands originating external to the EICC from dictating the distribution of emergency power provided by the RAT generator to the one or more emergency loads.

5. The power generation/distribution system of claim 1, wherein the first time delay relay circuit is un-energized during normal operations.

6. The power generation/distribution system of claim 1, wherein the RAT GLC is selectively energized by a generator control unit (GCU) associated with the RAT in response to the RAT generator reaching an established speed and/or voltage threshold level.

7. The power generation/distribution system of claim 1, wherein the EICC further comprises an input for receiving a test command provided to the at least one time delay relay circuit to test the first time delay.

8. The power generation/distribution system of claim 1, wherein the EICC further comprises:
 a second time delay relay circuit activated by energizing of the RAT GLC;
 wherein activating the second time delay relay circuit energizes the second time delay relay circuit after a second time delay; and
 wherein energizing of the second time delay circuit allows distribution of emergency electrical power from the AC ESS bus to the one or more emergency loads.

9. The power generation/distribution system of claim 3, wherein the EICC further comprises:
 a transformer rectifier unit connected between the AC ESS bus and the at least one DC essential load.

10. The power generation/distribution system of claim 3, wherein the EICC further comprises:
 a direct current essential bus (DC ESS bus) connected to the AC ESS bus and the at least one DC essential load; and
 a battery connected to the DC ESS bus configured to power the at least one DC essential load after the loss of primary power and before expiration of the first time delay.

11. The power generation/distribution system of claim 8, wherein the first time delay is less than the second time delay.

12. An emergency integrated control center (EICC) comprising:
 an alternating current essential bus (AC ESS bus) adapted to receive a first connection to one or more essential loads and a second separate connection to one or more emergency loads, the one or more essential loads including at least one alternating current (AC) essential load; and
 a RAM air turbine generator line contactor (RAT GLC) controlled to supply primary electrical power to the AC ESS bus during normal operation, supply emergency power provided to the AC ESS bus during emergency operation, and upon detecting a loss of primary electrical power, autonomously transition the one or more essential loads to emergency power provided to the AC ESS bus prior to transitioning the one or more emergency loads to emergency power without stalling the RAT generator;
 wherein the AC ESS bus is adapted to receive the first connection directly to the at least one AC essential load such that the at least one AC essential load receives emergency electrical power immediately following energizing of the RAT GLC; and
 wherein energizing the RAT GLC enforces a default speed command on the essential loads by disconnecting a speed command provided to the essential loads, the speed command originating from a location external to the EICC.

13. The EICC of claim 12, further comprising:
 at least one time delay relay circuit activated by energizing of the RAT GLC, the at least one time delay relay circuit including at least one of:
  a first time delay relay circuit energized after a first time delay calculated from when the emergency power has first been provided to the AC ESS bus by the RAT GLC, such that energizing the first time delay relay circuit causes emergency power to be distributed, after the first time delay, from the AC ESS bus to a third connection for at least one essential load not connected directly to the AC ESS bus; and
  a second time delay relay circuit energized after a second time delay calculated from when the emergency power has first been provided to the AC ESS bus by the RAT GLC, such that energizing the second time delay relay circuit causes emergency power to be distributed, after the second time delay, from the AC ESS bus to the second connection for the AC emergency loads.

14. The EICC of claim 12, further comprising a test command input connected to selectively energize at least one time delay relay circuit to test the respective at least one time delay provided by the at least one time delay relay circuit.

15. The EICC of claim 13, further comprising:
 a relay circuit that is in an energized state during normal operation and in a de-energized state during emergency operation; wherein
 in the energized state, the relay circuit is adapted to provide load commands originating from a location external to the EICC from controlling the distribution of power from the AC ESS bus to the second connection for the AC emergency loads; and
 in the de-energized state, the relay circuit is adapted to prevent the load commands originating from the location external to the EICC from controlling the distribution of power from the AC ESS bus to the one or more emergency loads.

16. A power generation/distribution system comprising:
 a primary power source configured to generate primary electrical power;
 a RAM air turbine (RAT) generator configured to generate emergency electrical power when deployed into an airstream;
 an emergency integrated control center (EICC) configured to transition a plurality of electrical loads from the primary electrical power to the emergency electrical power, the plurality of electrical loads including one or more essential loads and one or more emergency loads, each load connected directly or indirectly to an alternating current essential bus (AC ESS bus), the EICC selectively applying either primary electrical power or emergency electrical power to the AC ESS bus for selective distribution to the one or more essential loads and the one or more emergency loads;
 wherein the EICC is configured to monitor the primary electrical power and in response to a detected loss of primary electrical power selectively disables a supply of primary electrical power to the one or more essential loads and the one or more emergency loads, and the EICC is configured to manage subsequent loading of the RAT generator by the one or more essential loads and the one or more emergency loads; and
 wherein the EICC comprises:
  a RAM air turbine generator line contactor (RAT GLC) that provides primary power to the AC ESS bus when de-energized and emergency power to the AC ESS bus when energized, and
  a first time delay relay circuit activated by energizing of the RAT GLC, wherein activating the first time delay relay circuit energizes the first time delay relay circuit after a first time delay;
  wherein energizing of the first time delay circuit allows distribution of emergency electrical power from the AC ESS bus to the one or more emergency loads.

17. The power generation/distribution system of claim 16, wherein energizing the RAT GLC activates a relay configured to enforce a default speed command on the one or more emergency loads by disconnecting a speed command originating external to the EICC from being provided to the one or more emergency loads at least until expiration of the first time delay.

18. The power generation/distribution system of claim 16, wherein the one or more essential loads includes at least one alternating current (AC) essential load connected directly to the AC ESS bus such that the at least one AC essential load receives emergency electrical power immediately following energizing of the RAT GLC.

19. The power generation/distribution system of claim 16, wherein de-energizing at least one of a first relay circuit and a second relay circuit prevents load commands originating external to the EICC from dictating the distribution of emergency power provided by the RAT generator to the one or more emergency loads.

20. The power generation/distribution system of claim 16, wherein the first time delay relay circuit is un-energized during normal operations.

21. The power generation/distribution system of claim 16, wherein the RAT GLC is selectively energized by a generator control unit (GCU) associated with the RAT in response to the RAT generator reaching an established speed and/or voltage threshold level.

22. The power generation/distribution system of claim 16, wherein the EICC further comprises an input for receiving a test command provided to the at least one time delay relay circuit to test the first time delay.

* * * * *